United States Patent
Wisniewski et al.

(10) Patent No.: US 11,623,750 B2
(45) Date of Patent: Apr. 11, 2023

(54) SCREEN CARRIER ARRANGEMENT AND PASSENGER SEAT ARRANGEMENT

(71) Applicant: Adient Aerospace, LLC, Bothell, WA (US)

(72) Inventors: Max Wisniewski, Kirkland, WA (US); Sahng Seok Lee, Bothell, WA (US)

(73) Assignee: Adient Aerospace, LLC, Bothell, WA (US)

( * ) Notice: Subject to any disclaimer, the term of this patent is extended or adjusted under 35 U.S.C. 154(b) by 71 days.

(21) Appl. No.: 17/338,540

(22) Filed: Jun. 3, 2021

(65) Prior Publication Data

US 2021/0380256 A1    Dec. 9, 2021

Related U.S. Application Data (60) Provisional application No. 63/034,020, filed on Jun. 3, 2020.

(51) Int. Cl.
  B64D 11/06    (2006.01)

(52) U.S. Cl.
  CPC .................. B64D 11/0606 (2014.12)

(58) Field of Classification Search
  CPC .... B64D 11/0606; B64D 11/0023; B60N 2/91
  See application file for complete search history.

(56) References Cited

U.S. PATENT DOCUMENTS

| | | | | |
|---|---|---|---|---|
| 11,345,476 | B2 * | 5/2022 | Dowty | B64D 11/0606 |
| 11,453,501 | B2 * | 9/2022 | White | B64D 11/0601 |
| 2018/0281963 | A1 * | 10/2018 | Dowty | B64D 11/0606 |
| 2021/0221516 | A1 * | 7/2021 | Bonnefoy | B64D 11/0641 |
| 2022/0063809 | A1 * | 3/2022 | Thomas | B64D 11/0606 |
| 2022/0161930 | A1 * | 5/2022 | Aten | B64D 11/0606 |

FOREIGN PATENT DOCUMENTS

| | | | |
|---|---|---|---|
| EP | 3981664 A1 | * | 4/2022 |
| WO | WO-2021262215 A1 | * | 12/2021 |

* cited by examiner

*Primary Examiner* — Richard Green
*Assistant Examiner* — Madison Elizabeth Dittner
(74) *Attorney, Agent, or Firm* — Barta, Jones & Foley, PLLC (57) ABSTRACT

A seat carrier arrangement includes a first screen carrier having a carrier body extending vertically from a vehicle floor and a second screen carrier having a carrier body arranged at a distance and substantially parallel to the first screen carrier. At least one of the first and second screen carriers includes a screen element configured to move between a stowed position within the carrier body and an extended position extending from the carrier body. The screen element is concealed within the carrier body in the stowed position and extending from one of the first or second screen carriers to and detachably attached to the carrier body of the other one of the first or second screen carriers in an extended position.

20 Claims, 12 Drawing Sheets

SCREEN CARRIER ARRANGEMENT AND PASSENGER SEAT ARRANGEMENT

CROSS-REFERENCE TO RELATED APPLICATION

This application claims the benefit of and priority to U.S. Provisional Application No. 63/034,020, entitled "Screen Carrier Arrangement And Passenger Seat Arrangement", filed Jun. 3, 2020, which is incorporated by reference herein in its entirety.

BACKGROUND

Many vehicles, such as passenger transport vehicles, aircrafts, buses, trains or the like have privacy dividers, such as bulkheads, screens or doors or the like to separate passenger compartments and/or seats. These privacy dividers are typically permanent fixtures or difficult to reconfigure. For example, different privacy arrangements are configured for different seating arrangements and cannot be easily changed (e.g., if a passenger desires privacy during part of a flight, but not the entire flight, or if only certain passengers desire privacy). As a result, reconfiguration is often not performed, which can result in a reduced user experience (e.g., if a passenger wants to talk with a person in an adjacent seat or if a passenger desires privacy and no divider is present). And, when reconfiguration is performed, it is time consuming and/or costly.

SUMMARY

In one aspect, a screen carrier arrangement includes a first screen carrier having a carrier body extending vertically from a vehicle floor and a second screen carrier having a carrier body arranged at a distance and substantially parallel to the first screen carrier. At least one of the first and second screen carriers includes a screen element configured to move between a stowed position within the carrier body and an extended position extending from the carrier body. The screen element is concealed within the carrier body in the stowed position and extending from one of the first or second screen carriers to and detachably attached to the carrier body of the other one of the first or second screen carriers in an extended position.

In another aspect, a passenger seat arrangement for a vehicle cabin includes at least one seat, a first screen carrier having a carrier body arranged adjacent to the at least one seat and extending vertically from a vehicle floor, and a second screen carrier having a carrier body arranged in front of the first screen carrier. At least one of the first and second screen carriers includes a screen element configured to move between a stowed position within the carrier body and an extended position extending from the carrier body. The screen element is concealed within the carrier body in the stowed position and extending from one of the first or second screen carriers to and detachably attached to the carrier body of the other one of the first or second screen carriers in an extended position.

In another aspect, a method includes installing the screen carrier arrangement in an aircraft.

BRIEF DESCRIPTION OF THE DRAWINGS

The present disclosure will become more fully understood from the detailed description given herein and the accompanying drawings, which are given by way of illustration only, and thus, are not limiting of the described examples, wherein.

Corresponding parts are marked with the same reference symbols in all figures.

DETAILED DESCRIPTION

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment", "one implementation", or "one example" are not intended to be interpreted as excluding the existence of additional embodiments, implementations, or examples that also incorporate the recited features. Moreover, unless explicitly stated to the contrary, embodiments, implementations, or examples "comprising" or "having" an element or a plurality of elements having a particular property can include additional elements not having that property.

While various spatial and directional terms, such as "top," "bottom," "upper," "lower," "vertical," and the like are used to describe embodiments, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations provide a screen carrier arrangement for a vehicle cabin, such as an aircraft cabin or other passenger transport cabin, having privacy features and/or safety features. In one implementation, a first screen carrier arrangement has a screen carrier with a carrier body arranged to extend vertically from a vehicle floor and a second screen carrier has a carrier body arranged distanced and parallel to the first screen carrier (e.g., coupled to a seat in another row of seats and substantially parallel to the first screen carrier). One or more of the screen carriers include a screen element that is fully stowable (e.g., retractable and concealed) within a corresponding carrier body and extendable from the carrier body towards the other one of the carrier bodies. In one example, when the screen element is in a fully stowed position, the screen element is rolled up within the corresponding carrier body and when the screen element is in a fully extended position, the screen element extends a distance between the screen carriers and is detachably attached to the other one of the carrier bodies to form a privacy wall or divide. As a result, a personalized screen carrier arrangement is provided that uses less mounting space, is easy to assemble and disassemble, is easy to use, and has less assembly parts. The various examples thereby provide a lightweight configuration that is more cost effective (e.g., reduced cost in manufacture, installation, and maintenance).

It should be noted that although various examples are described in an aircraft environment and having a particular location therein, one or more examples described herein are implementable in different locations, as well as in non-aircraft environments, such as with seats in other vehicles. For example, the screen carrier arrangement can be arranged anywhere within a vehicle cabin (e.g., the screen carrier arrangement can be arranged in any passenger transport and carrying vehicle, such as a bus, a train, an aircraft or the like) to separate two or more passenger areas from one another when desired or needed, and wherein by retracting and stowing the screen element, passenger areas may be enlarged and merged.

The various examples provide features in addition to the privacy feature. For example, an improved passenger seat arrangement provides privacy features, as well as safety features, such as with respect to safety regulations and health reasons (e.g., restraining orders, social separation regulations, etc.). Thus, the passenger seat arrangement provides a simple and lightweight screen carrier arrangement to ensure privacy and/or safety features in various examples, and which also requires less mounting space. For example, in order to provide enhance or increased safety, the screen element can be easily pulled out of the corresponding carrier body and detachably attached to another carrier body to separate two adjacent areas, such as in case of restraining orders and/or social separation regulations. Moreover, the screen element can be easily pulled out of the corresponding carrier body and detachably attached to another carrier body to provide privacy to adjacent passengers. This also increases a feeling of comfort and luxury in the seating arrangement, such as in an economy class.

Figure 1:
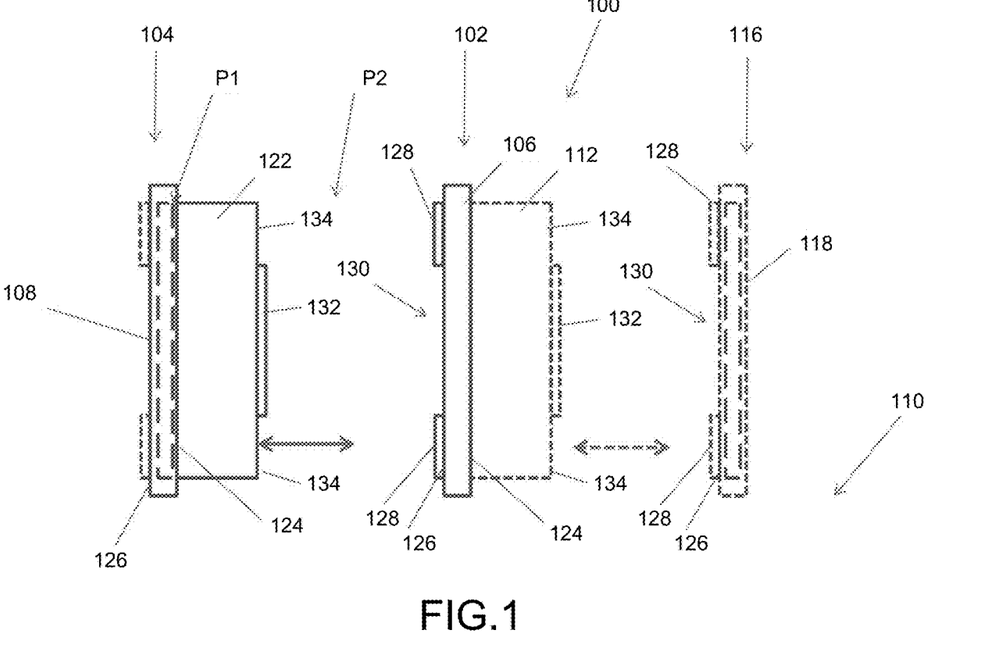
FIG. 1 shows schematically in a side view a screen carrier arrangement for a vehicle cabin in accordance with an example.

With particular reference to the Figures, FIG. 1 shows schematically in a side view, a screen carrier arrangement 1 for a vehicle cabin, illustrated as an aircraft cabin. In the illustrated example, the screen carrier arrangement 100 includes at least a first screen carrier 102 and a second screen carrier 104. The first screen carrier 102 includes a carrier body 106 arranged to extend vertically from a vehicle floor 110 and the second screen carrier 104 includes a carrier body 108 arranged at a distance in front of (as viewed in FIG. 1) and parallel to the first screen carrier 102. That is, the carrier bodies 106, 108 are arranged in a parallel relationship within the screen carrier arrangement 100.

In the illustrated example, the second screen carrier 104 further includes a screen element 122 that is fully stowable, in particular retractable, within the corresponding carrier body 108 and extendable from the carrier body 108 towards the carrier body 106 (towards a rearward direction as viewed in FIG. 1). When the screen element 122 is in a stowed position P1 (illustrated as a fully stowed position), the screen element 122 is rolled up (or otherwise stowed) within the carrier body 108 (e.g., to be concealed therein when not is use) and when the screen element 122 is in an extended position P2 (illustrated as a fully extended position), the screen element 122 extends a distance between the first and second screen carriers 102, 104 and is detachably attached to the carrier body 106. That is, the screen element 122 is extendable and removably attachable to an opposing carrier body, namely the carrier body 106.

In one example, the screen carrier arrangement 100 includes a plurality of screen carriers (illustrated as the first screen carrier 102, the second screen carrier 104, and a third screen carrier 116) arranged parallel to each other (one behind another in this example), wherein each screen carrier 102, 104, 116 includes a corresponding carrier body, namely the carrier body 106, the carrier body 108, and a third carrier body 118, respectively. In this example, the carrier bodies 106, 108, each include screen elements 112, 122, respectively, and each screen element 112, 122 is fully stowable within the corresponding carrier body 106, 108 and extendable in a same direction from the corresponding carrier body 106, 108 to another carrier body 108, 118 in a rearward direction (as viewed in FIG. 1). In one example, each carrier body 106, 108, 118 is substantially tube-shaped or box-shaped, but other shapes can be used (e.g., based on space or seat requirements or configurations). A height of each carrier body 106, 108, 118 in some examples is greater than a length and width of each carrier body 106, 108, 118. However, other configurations are contemplated. For example, as should be appreciated, the size and shape, as well as other configuration characteristics of the carrier bodies 106, 108, 118 can be varied as desired or needed (e.g., based on the type of seats, seating configuration, etc.)

In one example, the carrier bodies 106, 108 each comprise an opening side 124 corresponding to an extension direction of the screen element 112, 122, respectively. The carrier bodies 106, 118 each further include an attachment side 126 to which the screen element 112, 122, respectively, of the screen carrier 102, 104 (being relationally front screen carriers) is attachable. For example, the attachment or coupling arrangement can be in a detachable form- and/or force-fitting manner. In one example, the attachment side 126 includes at least one magnetic attachment device 128 (e.g., one or more magnets). However, any suitable attachment and/or locking mechanism can be used.

In the illustrated example, the attachment side 126 includes upper and lower attachment devices 128 spaced apart. That is, a gap 130 is provided between the attachment devices 128. The spacing defined by the gap 130 can be varied as desired or needed, such as based on the attachment or holding force requirements for the particular arrangement.

In various examples, the screen elements 122, 112 are flexible screens and/or roller blind elements. However, the screen elements 122, 112 can take different forms and be manufactured using different materials that allow for retraction and extension as described in more detail herein. Additionally, the configuration of the screen elements 122, 112 can be modified to accommodate different seats or seating arrangements, such as to have different stowage capabilities or extension capabilities.

In one example, to retract the screen elements 122, 112, a pre-loaded or drivable winding device (not shown) or other similar mechanism is provided in each of the carrier bodies 106, 108. In various examples, the screen elements 112, 122 include one end that is coupled to the carrier body 106, 108, respectively, and a free end that includes a gripping handle 132 and an attachment device 134 complementary (e.g., sized and shapes, and/or magnetically attractable) to the attachment device 128 of the carrier bodies 106, 118. In the fully extended position P2, the gripping handle 132 is positioned between the attachment devices 128, in particular within the gap 130. In the fully stowed position P1, the gripping handle 132 protrudes from the opening side 124 such that a user, passenger and/or crew member can grip the gripping handle 132 to pull the screen element 112, 122 out from the corresponding carrier body 106, 108 or detach the screen element 112, 122 from the attachment side 126 and to guide the screen element 112, 122 back into the corresponding carrier body 106, 108. It should be noted that the gripping handle 132 can be any element or member that allows for gripping by a user.

Figure 2A:
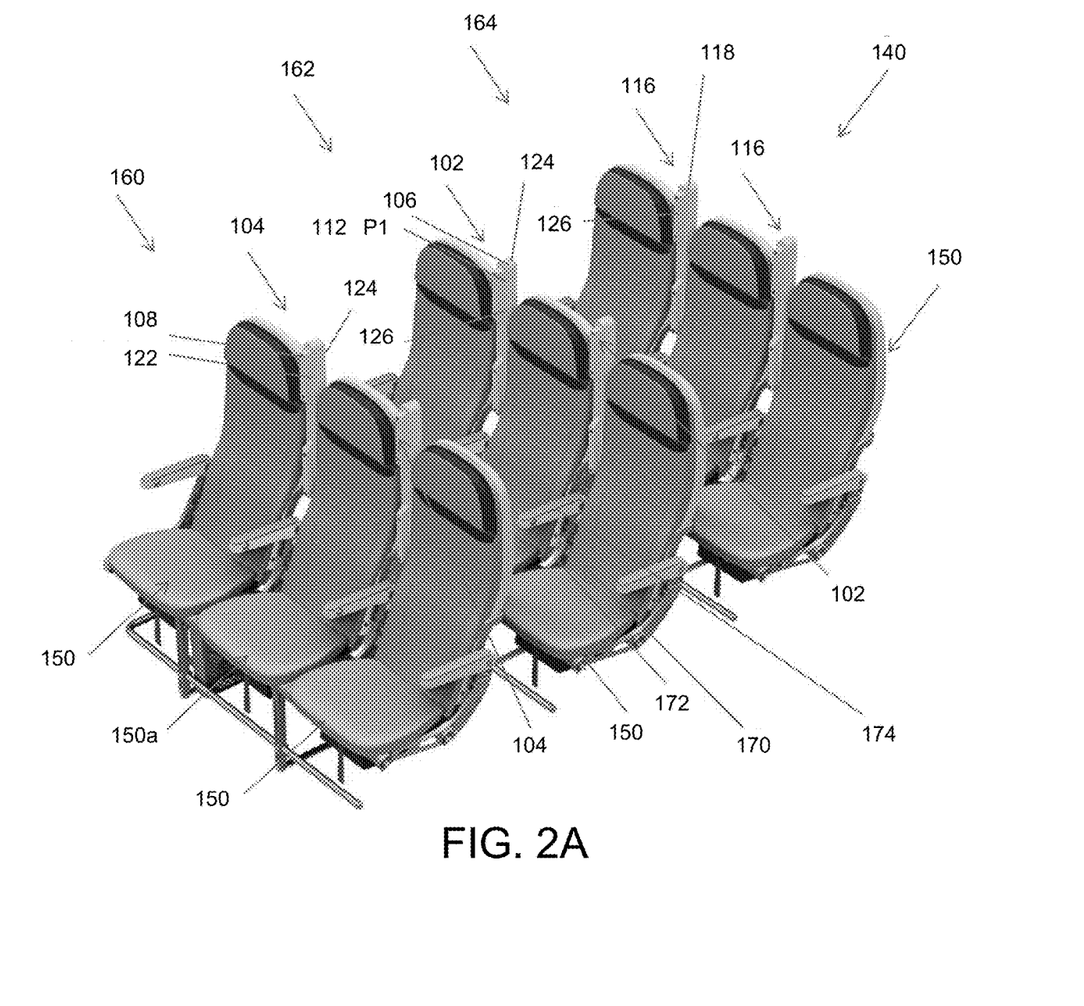
FIGS. 2A to 2C are perspective views of a passenger seat arrangement for a vehicle cabin with a plurality of seats and screen carriers in accordance with various examples.
Figure 2B:
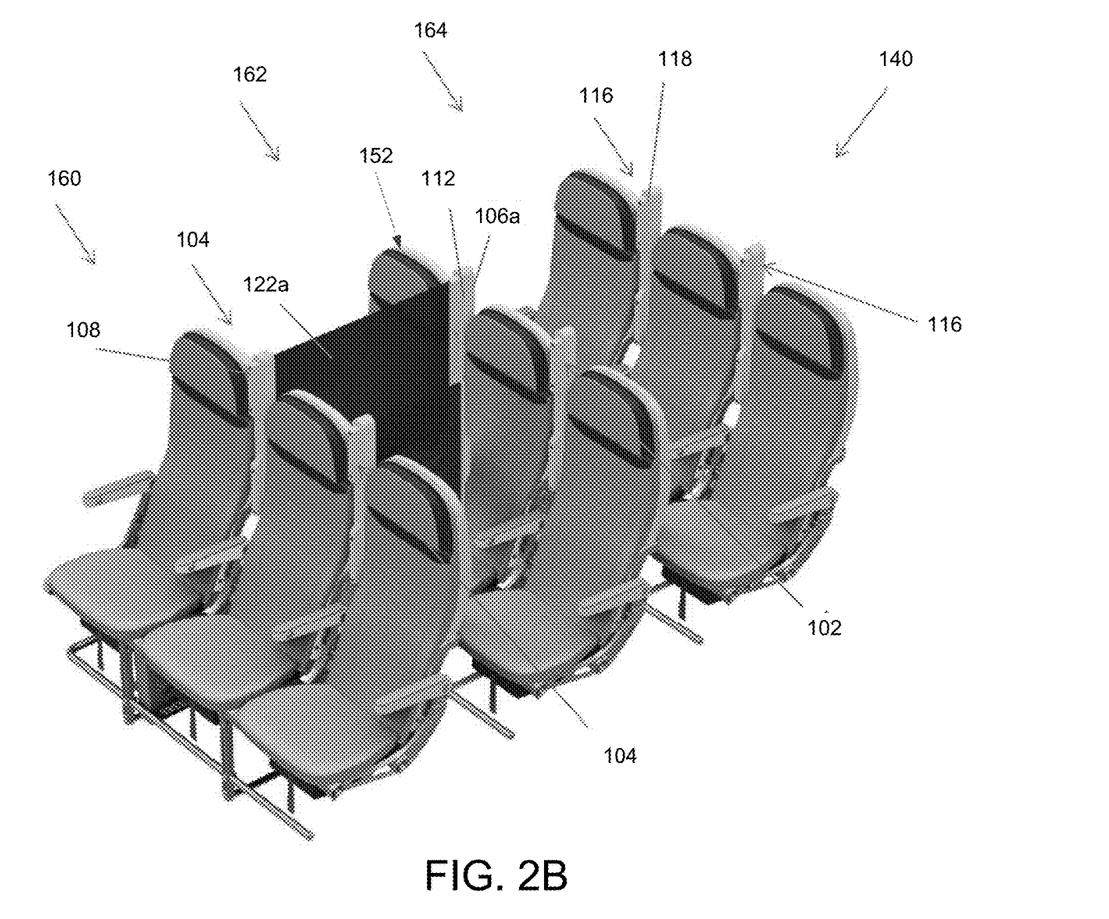
Figure 2C:
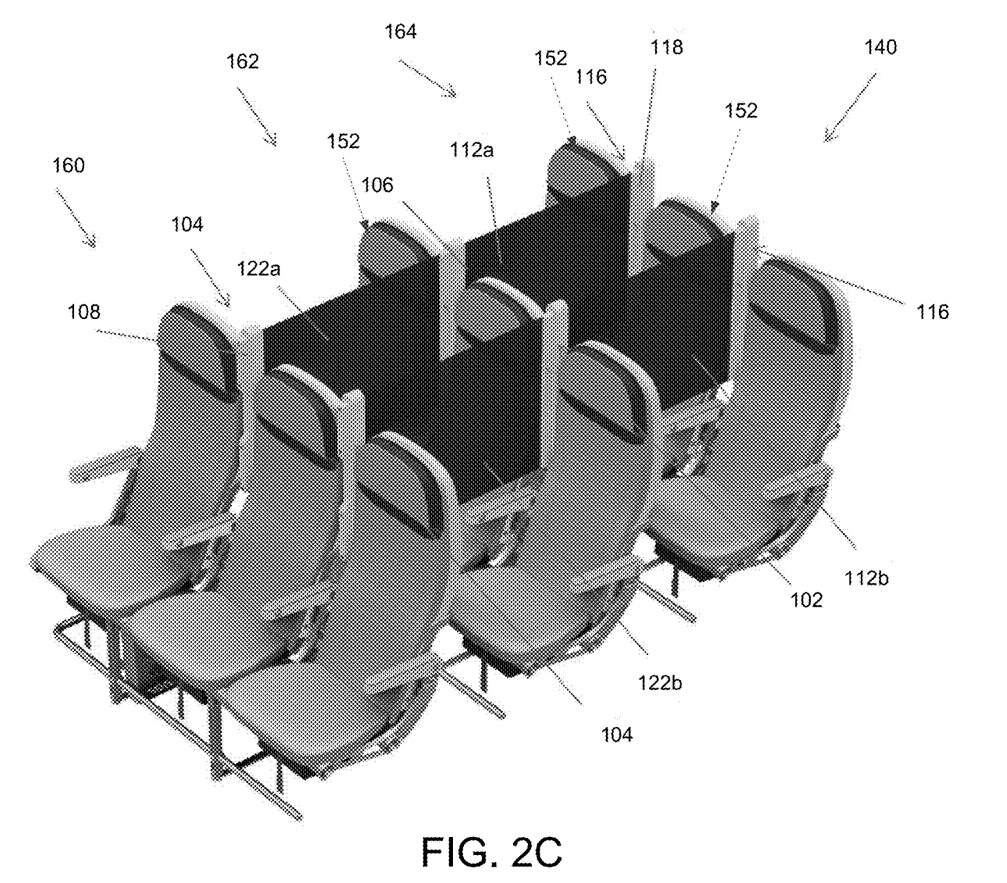

FIGS. 2A to 2C show perspective views of a passenger seat arrangement 140 for a vehicle cabin (illustrated as an aircraft cabin), having a plurality of seats 150 and screen carriers 102, 104, 116 (two are provided in each row of seats 150 on each side of the middle seat 150a in some examples). FIG. 2A shows the screen carriers 102, 104, 116 with screen elements 112, 122 in the fully stowed position P1. In the fully stowed position P1, each screen element 112, 122 is stowed (e.g., rolled up about a vertical axis) within the corresponding carrier body 106, 108. FIG. 2B shows the screen element 122a in the fully extended position P2 in which the screen element 122a is detachably attached to the carrier body 106a arranged in a rearward direction (e.g. removably coupled by magnetic force and/or a clip feature or the like extending from the seat 150 in front). FIG. 2C shows four screen elements 112a, 112b, 122a, 122b in the fully extended position P2. As should be appreciated, the herein described examples allow for different privacy and/or safety configurations that are easily changeable by extending or retracting the screen elements 112, 122.

In illustrated example, the passenger seat arrangement 140 includes a front row 160 with a group of three seats 150, a mid-row 162 with a group of three seats 150, and a rear row 164 with a group of three seats 150, wherein one screen carrier 102, 104, 116, respectively, is arranged between adjacent seats 150 of the group of three seats 150. That is, within each row 160, 162, 164, each screen carrier 102, 104, 116 is arranged adjacent to the corresponding seat 150 and extending vertically alongside a backrest 152 of the seat 150 (e.g., along a side of the backrest 152). It should be appreciated that in some examples, if a row of seats 150 is the last row (e.g., the last row in the aircraft, the last row in a section, etc.), the screen carrier does not include the screen element. Additionally, if the row of seats 150 is the front row, the screen element can be provided within a corresponding element (which can be another screen carrier) mounted to, for example, a wall of the aircraft cabin. In some examples, the screen carriers of the mid-row 162 and the rear row 164 optionally include screen elements that are then extendable in a direction towards the front row 160 and retractable in direction towards the rear row 164. As such, various methods of installing the screen carrier arrangement 100 are provided.

In one example, each screen carrier 102, 104 of the front row 160 and the mid-row 162 includes the screen element 112, 122, respectively, and each screen element 112, 122 is fully stowable within the corresponding carrier body 106, 108 and extendable in a same direction (e.g., extendable in rearward in a direction towards the rear row 164) from the corresponding carrier body 106, 108 to the carrier body 118 of the screen carrier 116 arranged in the rear row 164.

In one example, the carrier bodies 106, 108, 118 are each mounted to an armrest structure 170 arranged between adjacent seats 150. The armrest structure 170 in some examples includes a static portion 172 (e.g., non-movable portion) that is mounted to a base assembly of the seats 150. An armrest 174 of the armrest structure 170 is movable (e.g. pivotable about a transverse axis or slidable along a vertical axis), relative to the static portion 172 in some examples. The armrest 174 is also configured to be stowed and deployed (e.g., pivoted upward and downward) in various examples. Each carrier body 106, 108, 118 is mounted to the static portion 172 of the corresponding armrest structure 170 so that there is no interference with the carrier body 106, 108, 118 when moving the armrest 174. In particular, each carrier body 106, 108, 118 extends from an upper side of the armrest 174 to at least a top side of the backrest 152 in various examples. This configuration allows for providing maximum privacy and partition between passengers.

Figure 3:
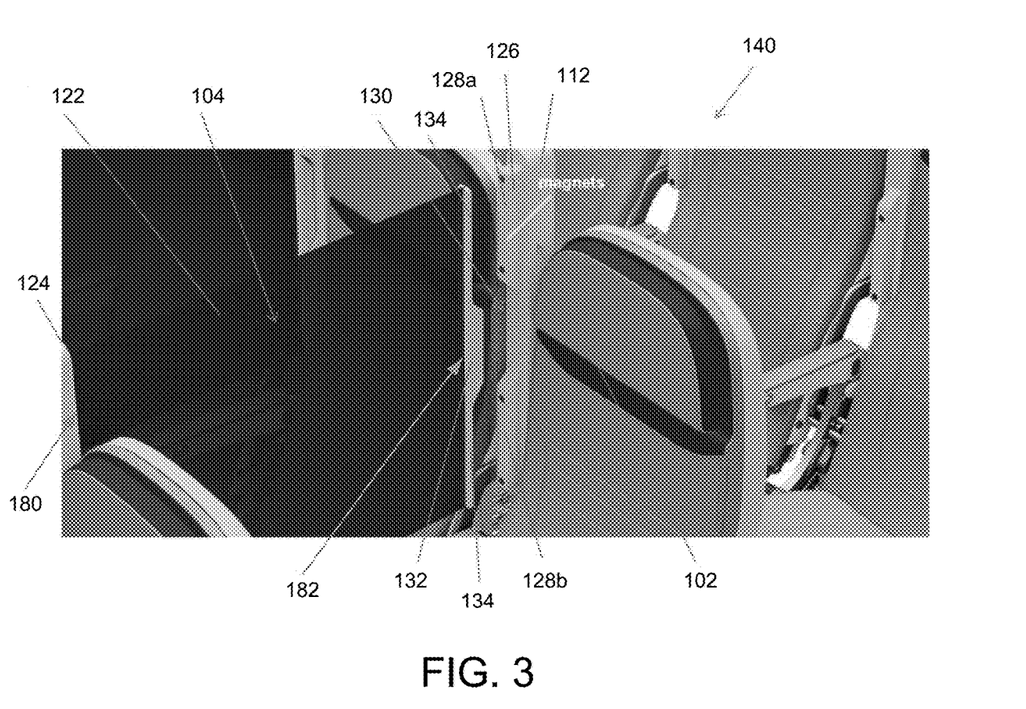
FIG. 3 is an enlarged perspective view of a section of the passenger seat arrangement according to FIGS. 2A to 2C.

FIG. 3 shows in an enlarged perspective of a section of the passenger seat arrangement 140 according to FIGS. 2A to 2C. In the illustrated example, as can be seen more clearly in this figure, the attachment side 126 include the upper and lower attachment device 128a, 128b with the gap 130 provided therebetween. The screen element 122 includes one end 180 coupled to the corresponding carrier body 108 and a free end 182 that includes at least the gripping handle 132 and attachment devices 134 that are complementary to the attachment devices 128 (e.g., to allow magnetic coupling). In the fully extended position P2, the gripping handle 132 is positioned between the attachment devices 126 within the gap 130. In the fully stowed position P1, the gripping handle 132 protrudes from the opening side 124 as shown more clearly in FIGS. 4 to 5B, such that, for example, a passenger can grip the gripping handle 132 to pull the screen element 112, 122 out from the corresponding carrier body 106, 108; or to detach the screen element 112, 122 from the attachment side 126 and to guide the screen element 112, 122 back into the corresponding carrier body 106, 108. Thus, in various examples, the carrier bodies 106, 108 include the opening side 124 corresponding to an extension direction of the screen element 112, 122 and an attachment side to which the screen element of another screen carrier is attachable.

Figure 4:
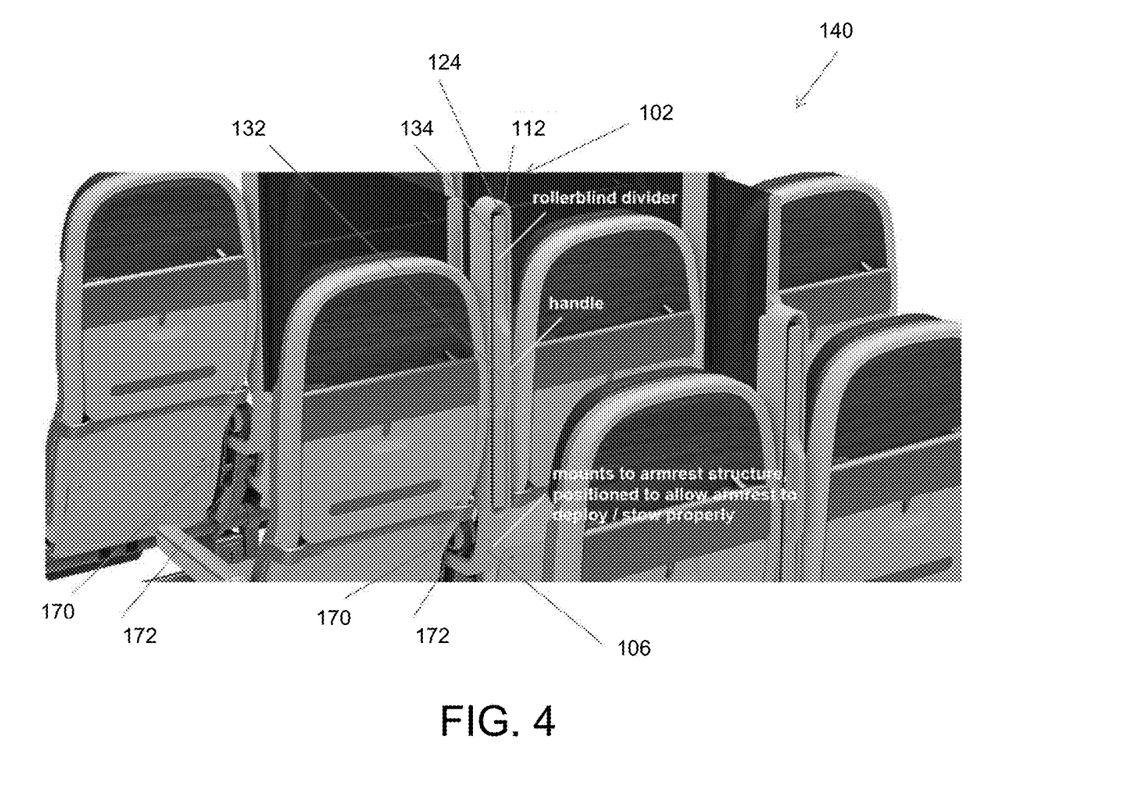
FIG. 4 is a perspective view of a rear section of the passenger seat arrangement according to FIGS. 2A to 2C.

FIG. 4 shows a perspective view of a rear section of the passenger seat arrangement 140 according to FIGS. 2A to 2C. The armrest structure 170 includes the static portion 172 mounted to the base assembly of the seats 150. The armrest 174 of the armrest structure 140 is movable as described herein relative to the static portion 172. The armrest 174 is capable of being stowed and deployed. As can be seen more clearly in this figures, each carrier body 106, 108, 118 is mounted to the static portion 172 of the corresponding armrest structure 170 (e.g., bolted to the armrest structure 170) so that there is no interference with the carrier body 106, 108, 118 when moving the armrest 174.

Figure 5A:
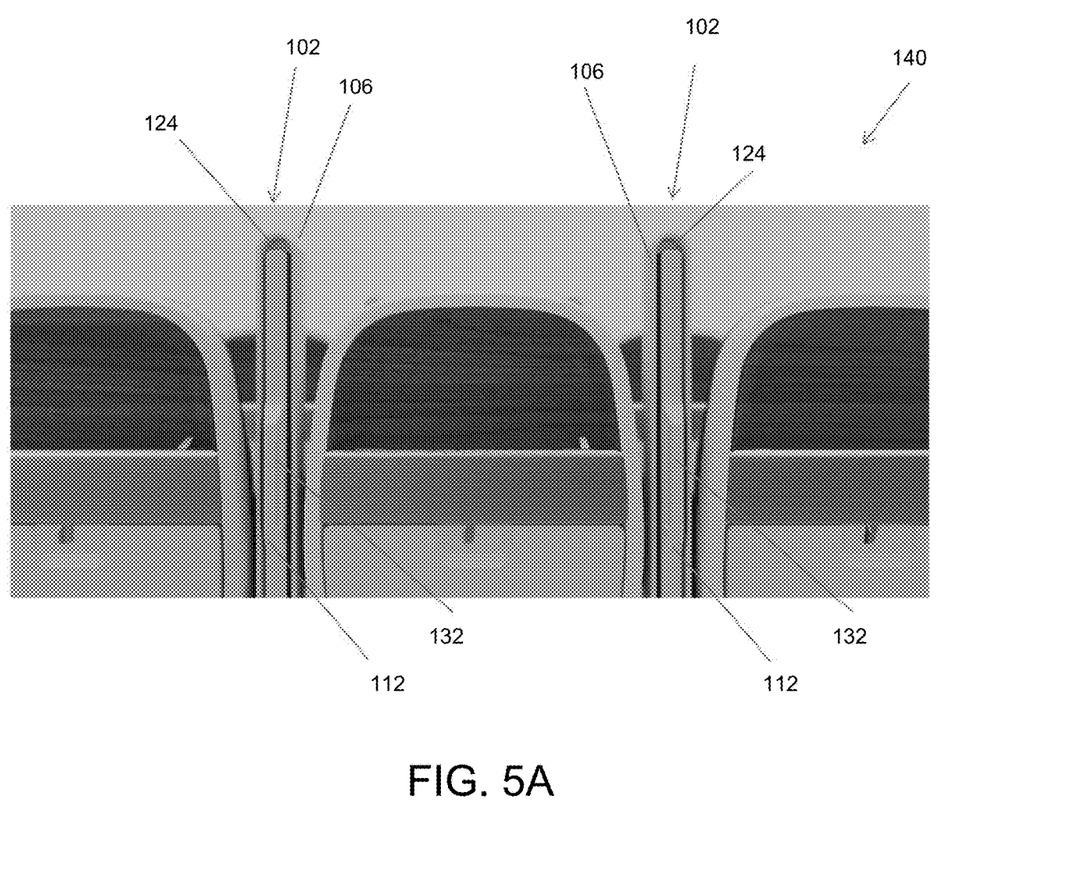
FIGS. 5A and 5B are enlarged rear views of a section of the passenger seat arrangement according to FIGS. 2A to 2C.
Figure 5B:
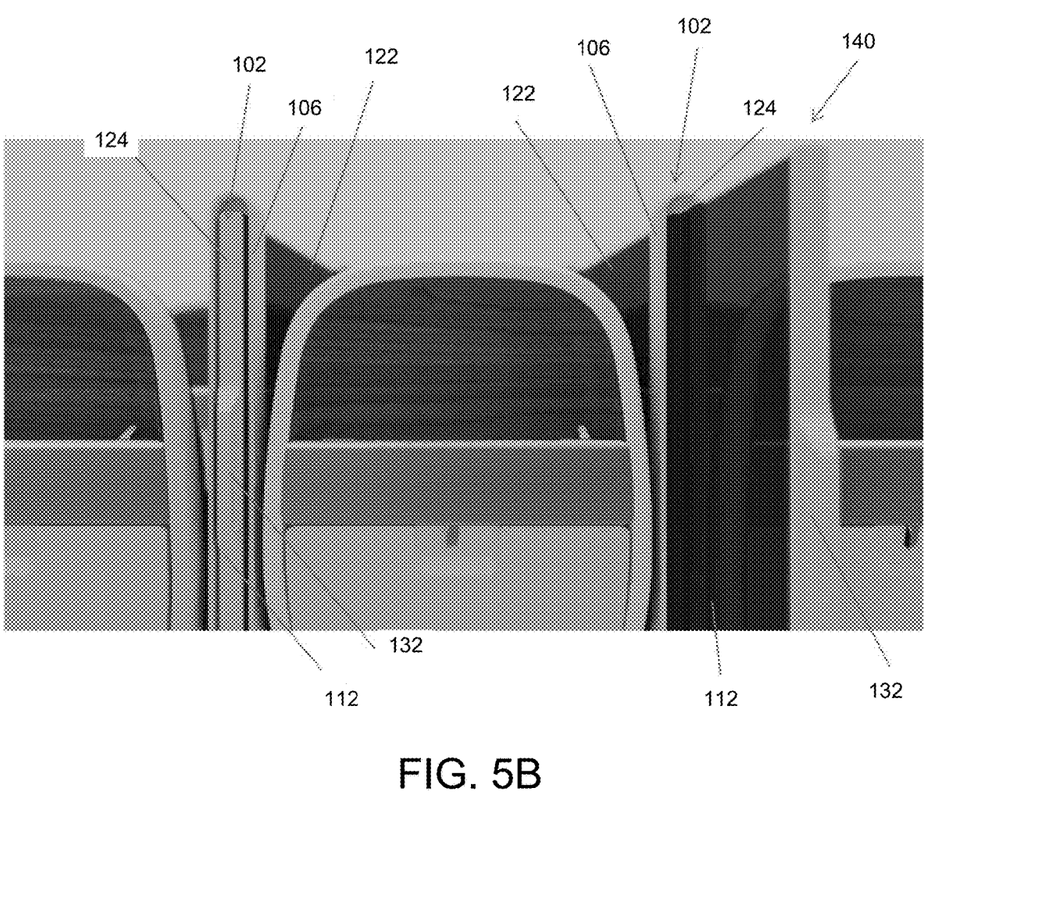

FIGS. 5A and 5B show enlarged rear views of a section of the passenger seat arrangement 140 according to FIGS. 2A to 2C. As can be seen more clearly in these figures, FIG. 5A shows stowed screen elements 112, 122, FIG. 5B shows fully extended screen elements 122 and one screen element 112 in an intermediate position (e.g., in the process of being retracted or extended or otherwise moved). In some example, the screen element 112 is configured to allow for being held or maintained in the intermediate position, such as to provide semi-privacy (e.g., using a semi-rigid or foldable rigid element).

Figure 6:
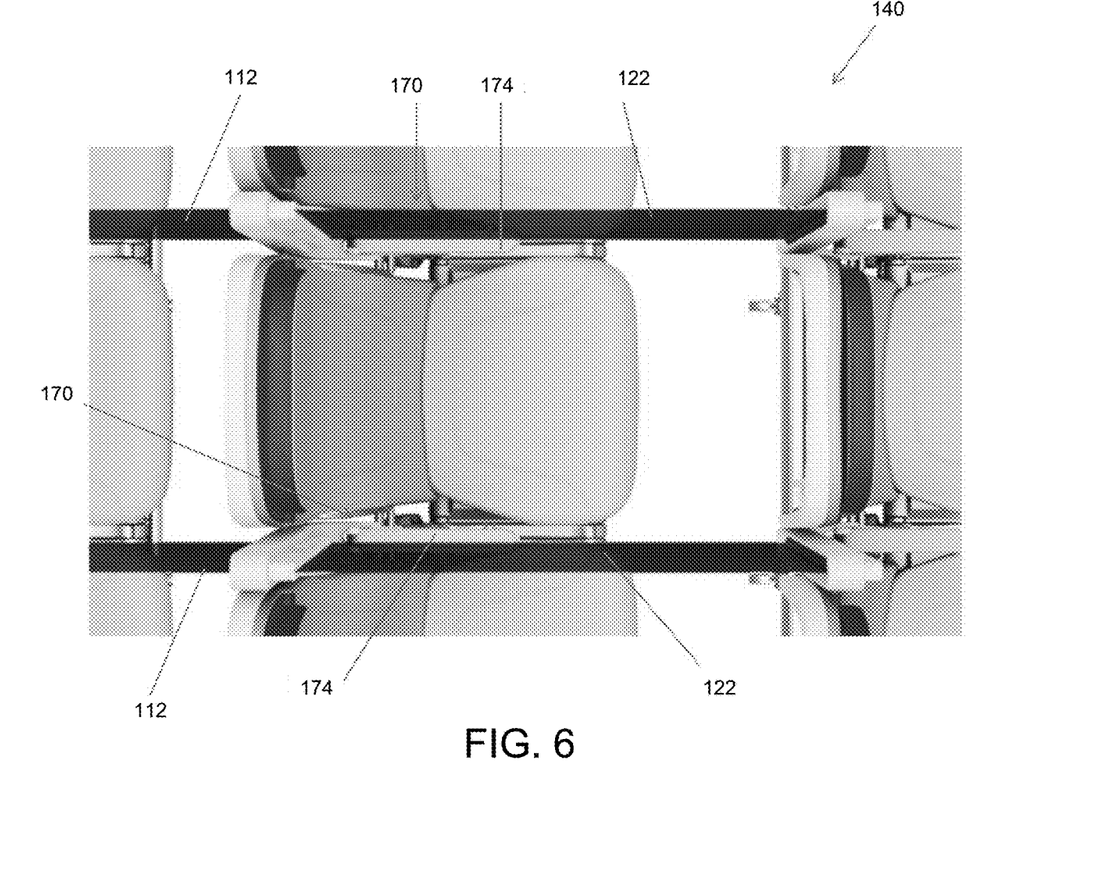
FIG. 6 is an enlarged top view of the passenger seat arrangement according to FIGS. 2A to 2C.

FIG. 6 show an enlarged top view of a section of the passenger seat arrangement 140 according to FIGS. 2A to 2C. As can be seen more clearly in this figure, the screen elements 112, 122 are arranged above the armrest structure 170 so that each passenger can use the armrests 174, as well as the screen elements 112, 122, when seated. That is, the various features can be used at the same time or operated while another feature is in use. It should be noted that in some examples, the privacy features are lockable, for example the screen elements 112, 120, 122 are lockable in a retracted (stowed) or extended (in-use) position by a crew member.

Thus, various implementations as described in one or more examples provide seat arrangements that include privacy and/or safety features that are easily operated. That is, a passenger is able to quickly and easily move one or more screen elements to provide privacy from one or more other passengers. As such, a level of privacy and/or safety is adjustable by passengers (or crew members) in various examples. For example, the screen carrier arrangement includes a plurality of movable screen carriers arranged in parallel one behind another, wherein each screen carrier has an adjustable screen element that is fully stowable within a corresponding screen carrier and extendable in a same direction from one seat to another seat.

Figure 7:
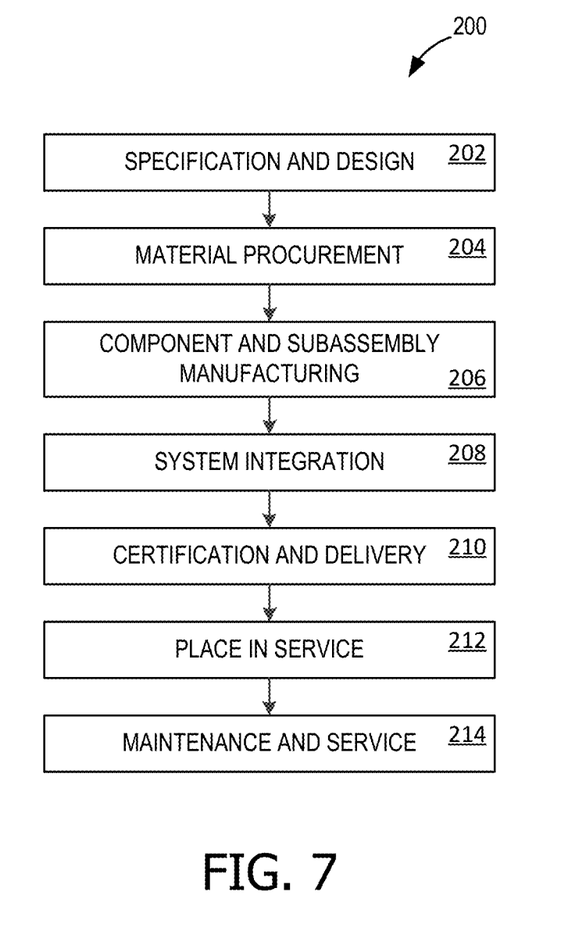
FIG. 7 is a block diagram of an apparatus production and service method that advantageously employs various aspects in accordance with an example.
Figure 8:
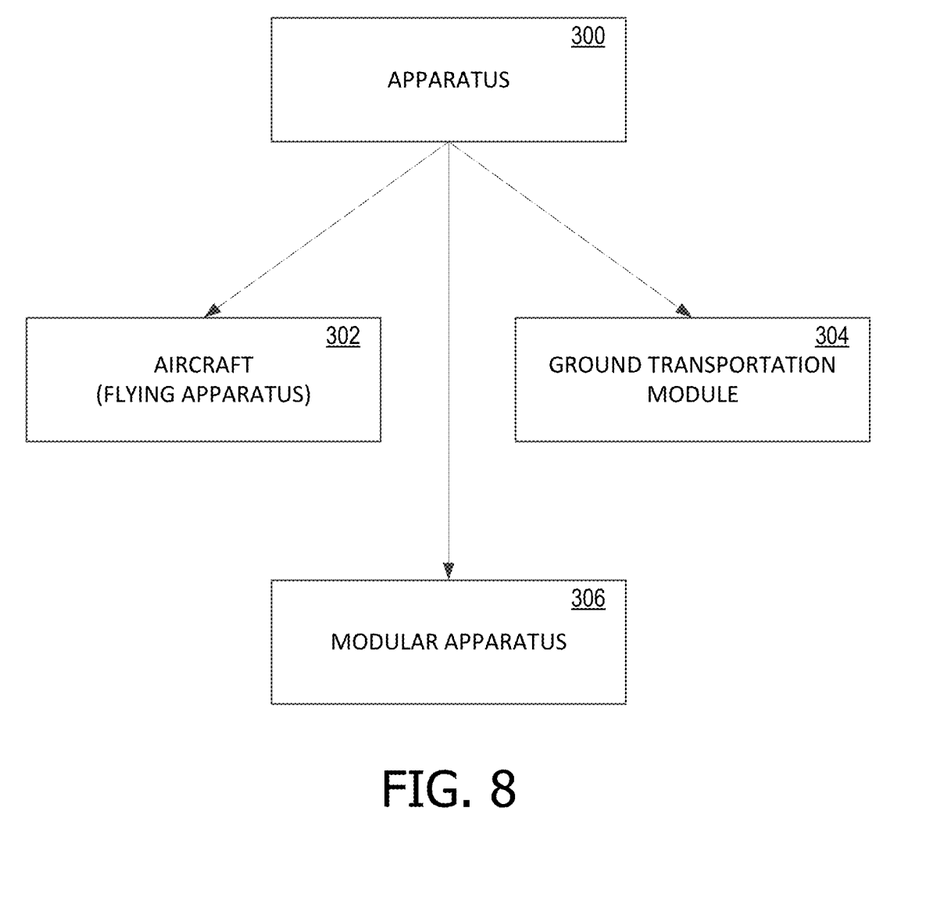
FIG. 8 is a block diagram of an apparatus for which various aspects may be advantageously employed in accordance with an example.
Figure 9:
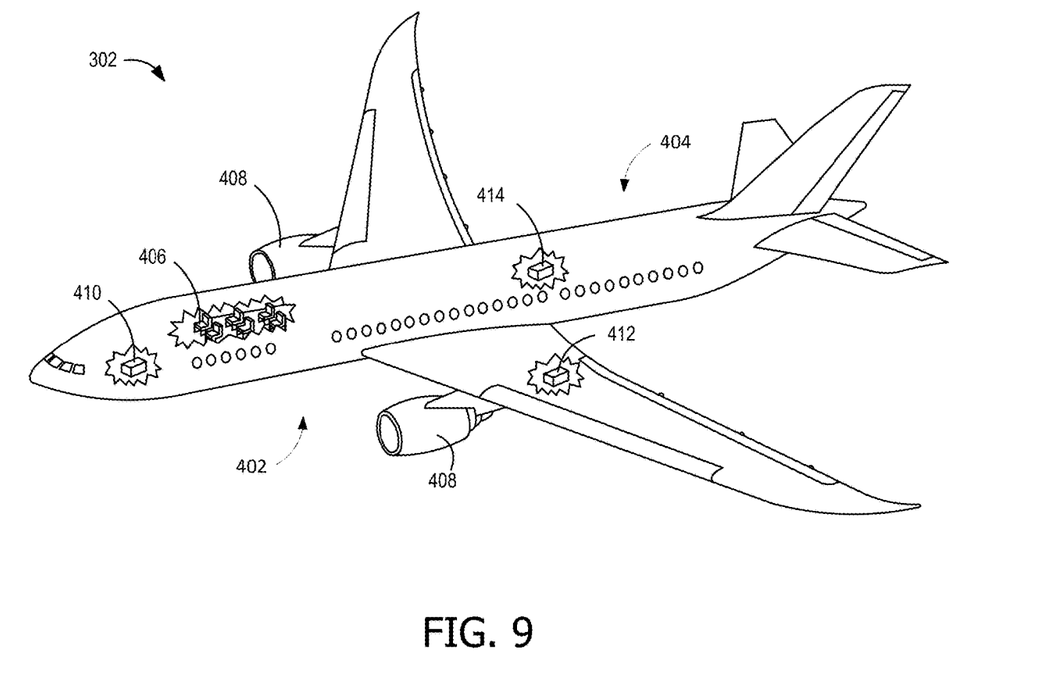
FIG. 9 is a schematic perspective view of a particular flying apparatus in accordance with an example.

Some examples described herein are used in manufacturing and service applications as shown and described in relation to FIGS. 7 to 9. Thus, examples described herein are described in the context of an apparatus of manufacturing and service method 200 shown in FIG. 7 and an apparatus 300 shown in FIG. 8. In FIG. 7, a diagram illustrating an apparatus manufacturing and service method 200 is depicted in accordance with an example. In one example, during pre-production, the apparatus manufacturing and service method 200 includes specification and design 202 of the apparatus 300 and material procurement 204. During production, component, and subassembly manufacturing 206 and system integration 208 of the apparatus 300 takes place. Thereafter, the apparatus 300 goes through certification and delivery 210 in order to be placed in service 212. While in service by a customer, the apparatus 300 is scheduled for routine maintenance and service 214, which in one example, includes modification, reconfiguration, refurbishment, and other maintenance or service subject to configuration management, described herein.

In one example, each of the processes of the apparatus manufacturing and service method 200 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 8, the apparatus 300 is provided. As shown in FIG. 8, an example of the apparatus 300 is a flying apparatus 302, such as an aerospace vehicle, aircraft, air cargo, flying car, satellite, planetary probe, deep space probe, solar probe, and the like. As also shown in FIG. 8, a further example of the apparatus 300 is a ground transportation apparatus 304, such as an automobile, a truck, heavy equipment, construction equipment, a boat, a ship, a submarine, and the like. A further example of the apparatus 300 shown in FIG. 8 is a modular apparatus 306 that comprises at least one or more of the following modules: an air module, a payload module, and a ground module. The air module provides air lift or flying capability. The payload module provides the capability of transporting objects such as cargo or live objects (people, animals, etc.). The ground module provides the capability of ground mobility. The solutions and examples herein can be applied to each of the modules separately or in groups, such as air and payload modules, or payload and ground modules, etc. or all modules.

With reference now to FIG. 9, a more specific diagram of the flying apparatus 302 is depicted in which an implementations described herein are advantageously employed. In this example, the flying apparatus 302 is an aircraft produced by the apparatus manufacturing and service method 200 in FIG. 7 and includes an airframe 402 with a plurality of systems 404 and an interior 406, which can include seats (e.g., seats having the screen carrier arrangement 100) that provide privacy features as described herein. Examples of the plurality of systems 404 include one or more of a propulsion system 408, an electrical system 410, a hydraulic system 412, and an environmental system 414. However, other systems are also candidates for inclusion. Although an aerospace example is shown, different advantageous examples are applied to other industries, such as the automotive industry, etc.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects and implementations or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of". "Consisting essentially of" when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the various examples in detail, it will be apparent that modifications and variations are possible without departing from the scope of aspects as defined in the appended claims. As various changes could be made in the above constructions, products, and methods without departing from the scope of aspects describe herein, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations described herein without departing from their scope. While the dimensions and types of materials described herein are intended to define the parameters of the various implementations described herein, the implementations are by no means limiting and are example implementations. Many other implementations will be apparent to those of ordinary skill in the art upon reviewing the above description. The scope of the various implementations described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 122(f), unless and until such claim limitations expressly use the phrase "means for" followed by a statement of function void of further structure.

This written description uses examples to disclose the various implementations, including the best mode, and also to enable any person of ordinary skill in the art to practice the various implementations, including making and using any devices or systems and performing any incorporated methods. The patentable scope of the various implementations is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A screen carrier arrangement comprising:
   a first screen carrier having a first carrier body extending vertically from a vehicle floor, the first carrier body mounted to an armrest structure of a passenger seat, the first carrier body extends from an upper side of the armrest structure;
   a second screen carrier having a second carrier body arranged at a distance and substantially parallel to the first screen carrier; and
   a screen element coupled to an end of the first carrier body, the screen element is movable between a stowed position within the first carrier body and an extended position extending from an opening side of the first carrier body, the screen element is concealed within the carrier body in the stowed position, and wherein the screen element extends from the opening side of the first carrier body of the first screen carrier and detachably attaches to an attachment side of the second carrier body of the second screen carrier in an extended position.

2. The screen carrier arrangement of claim 1, further comprising a plurality of additional screen carriers, wherein the first and second screen carriers, and the additional screen carriers are arranged in rows in parallel relationship one behind the other, and extendable in a same direction from a corresponding carrier body to another carrier body.

3. The screen carrier arrangement of claim 1, wherein the first carrier body of the first screen carrier comprises a first opening side corresponding to an extension direction of the screen element and a first attachment side to which another screen element of a second screen carrier is attachable.

4. The screen carrier arrangement of claim 3, wherein the attachment side comprises at least one magnetic attachment device.

5. The screen carrier arrangement of claim 1, wherein the first carrier body is substantially tube-shaped or box-shaped.

6. The screen carrier arrangement of claim 1, wherein a height of the first carrier body is greater than a length and width of the first carrier body.

7. The screen carrier arrangement of claim 1, wherein the screen element is a flexible screen or a roller blind element.

8. The screen carrier arrangement of claim 1, wherein in the stowed position, the screen element is rolled up within the first carrier body.

9. The screen carrier arrangement of claim 1, wherein the screen element comprises one end coupled to the first carrier body and a free end having at least a gripping handle and at least one attachment device that removably attaches to the attachment side of the second carrier body.

10. A passenger seat arrangement for a vehicle cabin, the passenger seat arrangement comprising:
   a seat;
   a first screen carrier having a first carrier body mounted to an armrest structure of the seat and extending vertically from a vehicle floor, the first carrier body extends from an upper side of the armrest structure;
   a second screen carrier having a second carrier body arranged in front of the first screen carrier; and
   a first screen element of the first screen carrier, the first screen element is configured to move between a stowed position within the first carrier body and an extended position extending from a first opening side of the first carrier body, and the first screen element being concealed within the first carrier body in the stowed position and extending from the first screen carrier; and
   a second screen element of the second screen carrier, the second screen element configured to move between a stowed position within the second carrier body and an extended position extending from a second opening side of the second carrier body, the second screen element detachably attaches to an attachment side of the first carrier body in an extended position.

11. The passenger seat arrangement of claim 10, further comprising:
   a front row with at least one pair of seats;
   a mid-row with at least one pair of seats; and
   a rear row with at least one pair of seats, wherein one screen carrier is arranged between each pair of seats, and each screen carrier of the front row and the mid-row comprises a screen element that is extendable in a same direction from the corresponding carrier body to the carrier body of another screen carrier arranged in the rear row.

12. The passenger seat arrangement of claim 10, wherein the second carrier body is mounted to an armrest structure between pairs of seats.

13. The passenger seat arrangement of claim 10, further comprising:
   a third carrier body mounted to an armrest structure associated with a second seat, the third carrier body comprising a third opening side corresponding to an extension direction of a third screen element and a second attachment side to which the first screen element of the first screen carrier is attachable.

14. The passenger seat arrangement of claim 13, wherein the attachment side comprises at least one magnetic attachment device.

15. The passenger seat arrangement of claim 10, wherein the first carrier body and the second carrier body are each substantially tube-shaped or substantially box-shaped.

16. The passenger seat arrangement of claim 10, wherein a height of the first carrier body and the second carrier body are each greater than a length and width of each carrier body.

17. The passenger seat arrangement of claim 10, wherein the first screen element and the second screen element are each one of a flexible screen or a roller blind element.

18. The passenger seat arrangement of claim 10, wherein the first carrier body and the second carrier body each comprises a pre-loaded or drivable winding device coupled to one end of the screen element.

19. The passenger seat arrangement of claim 10, wherein the first screen element and the second screen element are each configured with one end coupled to the corresponding carrier body and a free end having a gripping handle and at least one attachment device.

20. A method for installing a screen carrier arrangement in an aircraft, the screen carrier arrangement comprising:
   a first screen carrier having a first carrier body extending vertically from a vehicle floor, the first carrier body mounted to an armrest structure of a passenger seat, the first carrier body extending from an upper side of the armrest structure;
   a second screen carrier having a second carrier body arranged at a distance and substantially parallel to the first screen carrier; and
   a screen element coupled to an end of the first carrier body, the screen element is movable between a stowed position within the first carrier body and an extended position extending from an opening side of the first carrier body, the screen element is concealed within the carrier body in the stowed position, and wherein the screen element extends from the opening side of the first carrier body of the first screen carrier and detachably attaches to an attachment side of the second carrier body of the second screen carrier in an extended position.

* * * * *

UNITED STATES PATENT AND TRADEMARK OFFICE
CERTIFICATE OF CORRECTION

PATENT NO. : 11,623,750 B2  
APPLICATION NO. : 17/338540  
DATED : April 11, 2023  
INVENTOR(S) : Max Wisniewski and Sahng Seok Lee

Page 1 of 1

It is certified that error appears in the above-identified patent and that said Letters Patent is hereby corrected as shown below:

In the Claims

At Column 11, Line 34, "removably attachesto the" should be --removably attaches to the--;  
At Column 11, Lines 40-41, "extending verticallyfrom a vehicle" should be --extending vertically from a vehicle--.

Signed and Sealed this  
Nineteenth Day of March, 2024

Katherine Kelly Vidal  
*Director of the United States Patent and Trademark Office*